United States Patent [19]

Ritz

[11] Patent Number: 4,542,574

[45] Date of Patent: Sep. 24, 1985

[54] METHOD OF MAKING KNOBS AND HANDLES

[76] Inventor: Gerald Ritz, 250 Clarke Ave. Apt. PH7, Westmount, Montreal, Quebec, Canada

[21] Appl. No.: 540,341

[22] Filed: Oct. 11, 1983

[51] Int. Cl.[4] .............................................. B23P 17/00

[52] U.S. Cl. ...................................................... 29/417

[58] Field of Search .................... 29/417; D8/300-318

[56] References Cited

U.S. PATENT DOCUMENTS

| | | | |
|---|---|---|---|
| 3,942,237 | 3/1976 | Ongaro | 29/417 |
| 4,030,177 | 6/1977 | Schwarz | 29/417 |
| 4,294,005 | 10/1981 | Brennan | 29/417 |

OTHER PUBLICATIONS

Dakaware Catalog-Received 6/12/62.
Dmco Catalog, Received 3/17/67.

*Primary Examiner*—Howard N. Goldberg
*Assistant Examiner*—Steven Nichols
*Attorney, Agent, or Firm*—Price, Heneveld

[57] ABSTRACT

In the making of knobs, pulls or handles such as used on cabinets or furniture, a stock is created by casting a rod, bar or block of a suitable synthetic resin and, preferably, incorporating into the stock during the casting a pattern of various colors and configurations. The resulting stock is then machined to the final shape of the product and polished to the desired surface texture.

1 Claim, 7 Drawing Figures

METHOD OF MAKING KNOBS AND HANDLES

FIELD OF THE INVENTION

This invention relates to the manufacture of plastic knobs and pulls for doors, cabinets and furniture.

BACKGROUND OF THE INVENTION

The manufacture of knobs for various uses in as old art. Over the years knobs have been manufactured of various materials including wood, metal, ceramics and plastic. Knobs and pulls made of plastics heretofore have been manufactured by injection or compression molding. Knobs and pulls are both utilitarian and decorative items. Accordingly, the appearance of these items is a matter of major consideration and it is to the improvement of this aspect of the manufacture of these items that this invention is addressed.

BRIEF DESCRIPTION OF THE INVENTION

Plastic stock for the manufacture of the knobs or pulls is first cast to produce a bar or rod of the desired cross-sectional shape. In doing so, materials of various colors may be caused to form distinct bands or layers separated by transparent or semi-transparent layers or solid colors. The knobs and pulls are then machined from the bar or rod stock so formed resulting in a unique interaction between the surface of the final product and the internal pattern of the stock.

DESCRIPTION OF THE INVENTION

In the practice of this invention, to initiate the manufacture of knobs, handles or pulls the first step is to cast a rod, bar or tube of the material from which the final product is to be machined. The shape of the rod or bar is preferably dictated by the silhouette shape of one end or side of the final product, such as circular, hexogonal, square or some other geometric shape. This reduces the amount of machining required to produce the product as well as reducing waste.

Figure 4:
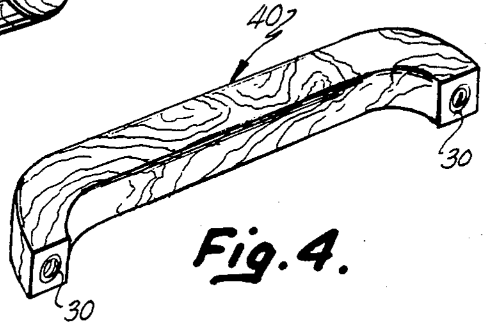
FIG. 4 is an oblique view of a pull made from the stock illustrated in FIG. 2.
Figure 5:
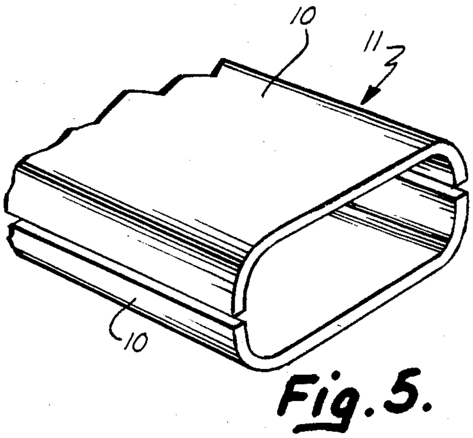
FIG. 5 is a fragmentary oblique view of one form of cylindrical stock.
Figure 7:
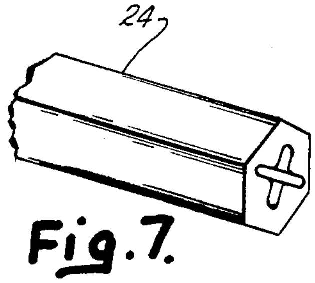
FIG. 7 is a fragmentary oblique view of a further form of the stock material used in this invention.
Figure 6:
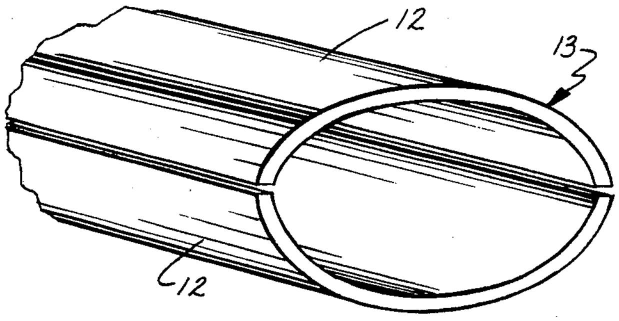
FIG. 6 is a fragmentary oblique view of another form of cylindrical stock.

Handles or pulls having the general shape of a portion of an elipse or a rectangle can be made from stock which is initially cast as a cylinder. The cylinder is then cut in half before machined the individual products to shape. Examples of this method are illustrated in FIGS. 4 and 5 where, in FIG. 4, the U-shaped bar stocks 10 are halves of a rectangular casting 11 and the curvilinear stocks 12 are halves of a generally eliptical casting 13. The stock can be cut or rather sliced by any conventional means such as a saw.

Figure 1:
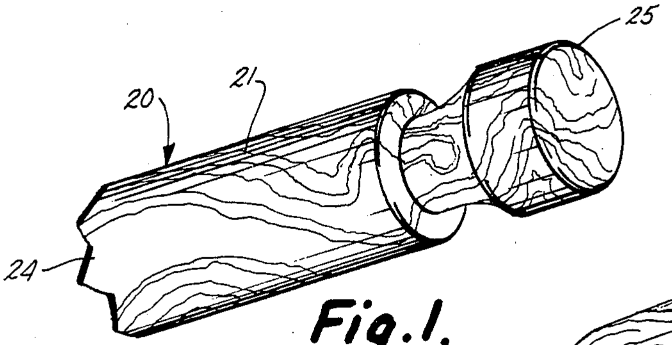
FIG. 1 is an oblique view of a rod from which a knob has been partially machined.

The basic stock such as the rod 20 (FIG. 1) and the cylindrical stock members 11 and 13 are cast from a suitable resin such as a polyester. In the casting, polyesters of various colors and degrees of transparency can be used and introduced in the process in such a manner as to create lines and laminations which appear both as surface ornamentation and as configurations below the product surface creating an impression of depth such as one perceives when viewing an agate (see ornamentation 21, FIGS. 1 and 2). Instead of this ornamentation, a mottled effect could be created or the stock could simply be colored without any decoration appearing in or below the surface of the stock.

Figure 3:
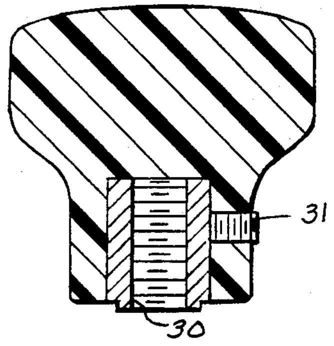
FIG. 3 is a central section of a knob illustrating a typical insert for attachment of the knob to its related structure.

The stock, after casting, is machined to the shape of the finished product. In the case of a conventional pull or knob the stock 24 can be fed to a lathe which machines the knob 25 (FIG. 1) by shaping it out of the stock. When this is done, the knob is severed from the stock and the next knob is then machined from the stock. Either before or after the severance of the knob from the stock, the machine surfaces are polished to provide the final finish. After severance from the stock, the necessary ferrule 30 (FIG. 3) or other anchor means is secured to the knob. To do this, the inner end of the knob is bored to provide a blind hole of the correct diameter. The metal ferrule 30 is then inserted and secured by any of the well known techniques such as providing the ferrule with a knurled surface and press fitting it into the opening or by adhesively bonding it to the knob. In the case of larger knobs such as for passage doors, a suitable locking screw 31 may be provided. In the case of smaller knobs, such as for cabinet drawer pulls, the knobs may be provided with a male or female threaded member to secure the knob.

Figure 2:
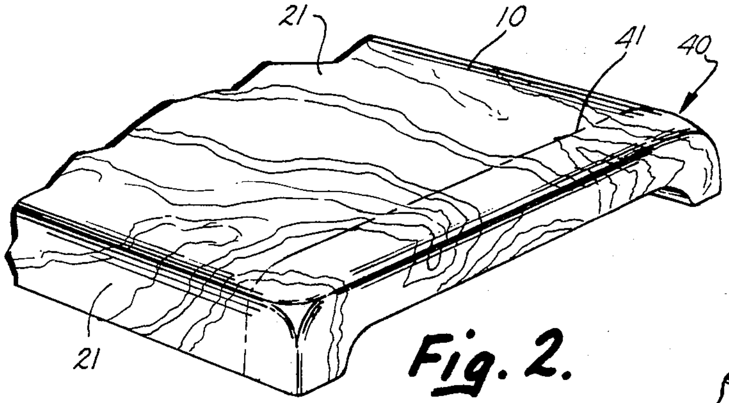
FIG. 2 is an oblique view of a bar indicating how it would be machined to create a handle or pull.

In the case of a pull or handle of a different shape such as the handle 40 illustrated in FIG. 2, the stock 10 is first sliced as at 41 into handles of the desired width. Thereafter the individual handles are machined to break the corners and then polished. They are also provided with suitable ferrules or other attachment means ready for installation.

It will be recognized that when a stock is used which has an internal pattern of ornamentation, particularly one that has some measure of random configuration, the machining of the products from the stock produces a range of different appearances not similar to an injection or compression molded product. Thus, a wide variety of patterns are created by the act of cutting into the stock. This is particularly true when the stock has a layered internal pattern. If the pattern is irregular, the complexity of the finished appearance of the final product will be significantly increased.

Creating the shape of the knobs by machining as contrasted to molding has another advantage. The shapes can be varied at very little cost. If the machining is done on an automatic lathe or similar equipment, it is only necessary to reset the pattern controlling the actuation of the cutting tools. This is a relatively simple and quick procedure. By contrast, any change in the shape or configuration of molded knobs requires either a new mold or modification of the existing ones. This is a slow and expensive procedure requiring the skills of a mold maker. Thus, the invention introduces flexibility in both ornamentation and configuration.

After the knob or pull has been fully or partially shaped, it is possible to machine out an area in the end face of the knob and insert into the resulting cavity a cap-like piece having embedded into it a decorative pattern of the desired design. This can be bonded into the body of the product and the assembled product can then be polished or otherwise finished to provide the final surface texture. Since the product is cast rather than extruded, the decorative insert can be placed in the mold and the body of the product molded around it in one or more steps. By proper adjustment of heat and pressure the bonding will be effected without leaving any line of demarkation.

The tooling necessary for cutting, machining and polishing the knobs and handles is conventional and requires no special description. The casting of the bars and rods is also state-of-the-art knowledge and does not form a part of this invention and thus is not described here.

Having described my invention and its objectives it will be recognized that any changes can be made in my method without departing from the principles thereof. Such changes are to be considered as included in the hereinafter appended claims unless these claims by their language specifically state otherwise.

We claim:

1. The method of making a knob, pull or handle including the steps of providing an elongated bar-like stock member cast from a synthetic resin into which has been incorporated a random pattern of various colors and degrees of transparency forming various laminations separated by irregular boundary lines extending lengthwise and throughout the body of the stock member, successively along the length of the stock machining radially into the sides of the stock member to form the shape of knobs, pulls or handles and in so doing cutting transversely across the random pattern along the surfaces so formed by the cutting to accentuate the laminar appearance and random nature thereof and thereby individualize the appearance of each of the knobs, pulls or handles, progressively severing each knob, pull or handle from the stock and in so doing cutting in a different direction across the random pattern and polishing the surfaces of the severed knobs, pulls or handles to the desired surface texture.

* * * * *